US012066119B2

United States Patent
Kostański et al.

(10) Patent No.: US 12,066,119 B2
(45) Date of Patent: Aug. 20, 2024

(54) AUTOMATIC DRAIN VALVE

(71) Applicant: B/E Aerospace, Inc., Winston Salem, NC (US)

(72) Inventors: Piotr Kostański, Iwiny (PL); Łukasz Sedlak, Miłochowice (PL); Filip Sobolewski, Wieluń (PL)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 18/068,114

(22) Filed: Dec. 19, 2022

(65) Prior Publication Data

US 2023/0194010 A1    Jun. 22, 2023

(30) Foreign Application Priority Data

Dec. 20, 2021    (EP) ..................................... 21461637

(51) Int. Cl.
*F16K 17/04*    (2006.01)
*E03D 1/34*    (2006.01)
(Continued)

(52) U.S. Cl.
CPC .......... *F16K 17/0486* (2013.01); *F16K 15/04* (2013.01); *F16K 17/168* (2013.01); *E03D 1/34* (2013.01); *Y10T 137/7836* (2015.04)

(58) Field of Classification Search
CPC ......... Y10T 137/3056; Y10T 137/3105; Y10T 137/73; Y10T 137/7738; Y10T 137/774;
(Continued)

(56) References Cited

U.S. PATENT DOCUMENTS 3,088,487 A * 5/1963 Peters .................... F16K 31/363
                                                    92/45
3,557,831 A * 1/1971 Katchka ............. G05D 16/0672
                                                    137/613
(Continued)

FOREIGN PATENT DOCUMENTS

DE    102016108360 A1    11/2017

OTHER PUBLICATIONS

European Search Report for Application No. 21461637.7, mailed May 27, 2022, 8 pages.

*Primary Examiner* — Robert K Arundale
(74) *Attorney, Agent, or Firm* — CANTOR COLBURN LLP

(57) ABSTRACT

A drain valve assembly includes a valve housing having an inlet port and an outlet port and a water collection chamber between the inlet port and the outlet port, and a poppet valve positioned in the water collection chamber and arranged to be normally sealingly positioned across the outlet port to prevent water exiting the water collection chamber to the outlet port. The poppet valve is attached to a pressure diaphragm across the water collection chamber such that when the pressure in the water collection chamber exceeds a predetermined opening pressure it causes the diaphragm to lift and to lift the poppet out of sealing engagement across the outlet port such that water can drain to the outlet port from the water collection chamber. The poppet valve has a hollow body defining a channel from a first end of the poppet valve.

13 Claims, 4 Drawing Sheets

(51) Int. Cl.
*F16K 15/04* (2006.01)
*F16K 17/168* (2006.01)

(58) Field of Classification Search
CPC ......... Y10T 137/7781; Y10T 137/7782; Y10T 137/7836
See application file for complete search history.

(56) References Cited

U.S. PATENT DOCUMENTS

| | | |
|---|---|---|
| 3,695,284 A | 10/1972 | Wallgren |
| 6,349,425 B1 * | 2/2002 | Stradinger .............. E03F 1/006 4/434 |
| 6,732,386 B2 | 5/2004 | Anderson et al. |
| 9,422,706 B2 | 8/2016 | Hoang et al. |
| 9,932,728 B2 | 4/2018 | Yu |
| 10,197,072 B2 | 2/2019 | Schiphorst et al. |
| 10,479,505 B2 | 11/2019 | Lutzer et al. |

* cited by examiner

AUTOMATIC DRAIN VALVE

CROSS-REFERENCE TO RELATED APPLICATIONS

This application claims priority to European Patent Application No. 21461637.7 filed Dec. 20, 2021, the entire contents of which is incorporated herein by reference.

TECHNICAL FIELD

The present disclosure is concerned with an automatic flow control valve for example a pressure-controlled drain valve for a water system such as, but not exclusively, a vacuum toilet or wash basin of the sort commonly used in aircraft, vehicles etc.

BACKGROUND

Vacuum water systems such as toilets or wash basins are used in e.g. trains, aircraft and other vehicle sanitation systems, and may also find application in other sanitation systems such as in temporary buildings or venues. Such pressure-controlled valves find use, for example, in systems in which water from one part of the system can be drained from the system or released into another part of the system. For example, drinking water or water from a wash basin, that is released into a waste pipe can be drained from the aircraft via a drain mast. Alternatively, in some systems, this water can be re-used for flushing a toilet. Such re-usable water is known as 'grey water'. Drain valves are used to release collected grey water when it has reached a certain level or established a certain pressure. Drain valves are not only used for controlling the flow of grey water; they may be used to control the flow of any water where it is desired to release a collected body of water.

Conventional drain valves are floating check valves which, in the closed position, allow the water from another part of the system, to collect in a water collecting reservoir. Water from the reservoir can be used as re-used grey water to flow to the toilet or the like that re-uses the water or can be ejected or drained from the system. In other words, in normal operation, the drain valve is closed and water flows through the system e.g. the grey water flows to the toilet flush. In some circumstances, though, it is necessary to drain the water from the system e.g. when the system, or part of the system, is not in use. The drain valve is, therefore, configured to open after collecting a certain amount of water, allowing the water to drain to e.g. a drain mast. The force to open the valve is from the hydrostatic pressure of the collected water. Because there is a high spread of vacuum levels on the outlet side of the valve, the opening force needs to be variable and also relatively high. A high opening force requires a large head of water on the collection side. Whilst in some applications, the space to ensure a high head of water may not be a problem, there are many applications where space is limited, such as in aircraft lavatories, and so it is not possible to create a high enough force to open the drain valve.

There is, therefore, a need for an automatic drain valve that will not need to create a variable and high valve opening force, and can operate on low magnitude and virtually constant opening force, regardless of the vacuum level and without the need for the space for a large head of water.

SUMMARY

According to the disclosure, there is provided a drain valve assembly comprising: a valve housing having an inlet port and an outlet port and a water collection chamber between the inlet port and the outlet port, and a poppet valve positioned in the water collection chamber and arranged to be normally sealingly positioned across the outlet port to prevent water exiting the water collection chamber to the outlet port, the poppet valve attached to a pressure diaphragm across the water collection chamber such that when the pressure in the water collection chamber exceeds a predetermined opening pressure it causes the diaphragm to lift and to lift the poppet out of sealing engagement across the outlet port such that water can drain to the outlet port from the water collection chamber; wherein the poppet valve has a hollow body defining a channel from a first end of the poppet valve, adjacent the outlet, and a second end of the poppet valve, and wherein the housing defines a vacuum cavity across the second end of the channel, such that a negative pressure acting on one end of the poppet valve is balanced by a negative pressure acting in the opposite direction at the other end.

A toilet system, e.g. for an aircraft, incorporating such a drain valve assembly is also provided

BRIEF DESCRIPTION

Examples of a drain valve assembly according to the disclosure will now be described with reference to the drawings. It should be noted that these are examples only and that variations are possible within the scope of the claims.

DETAILED DESCRIPTION

Figure 1:
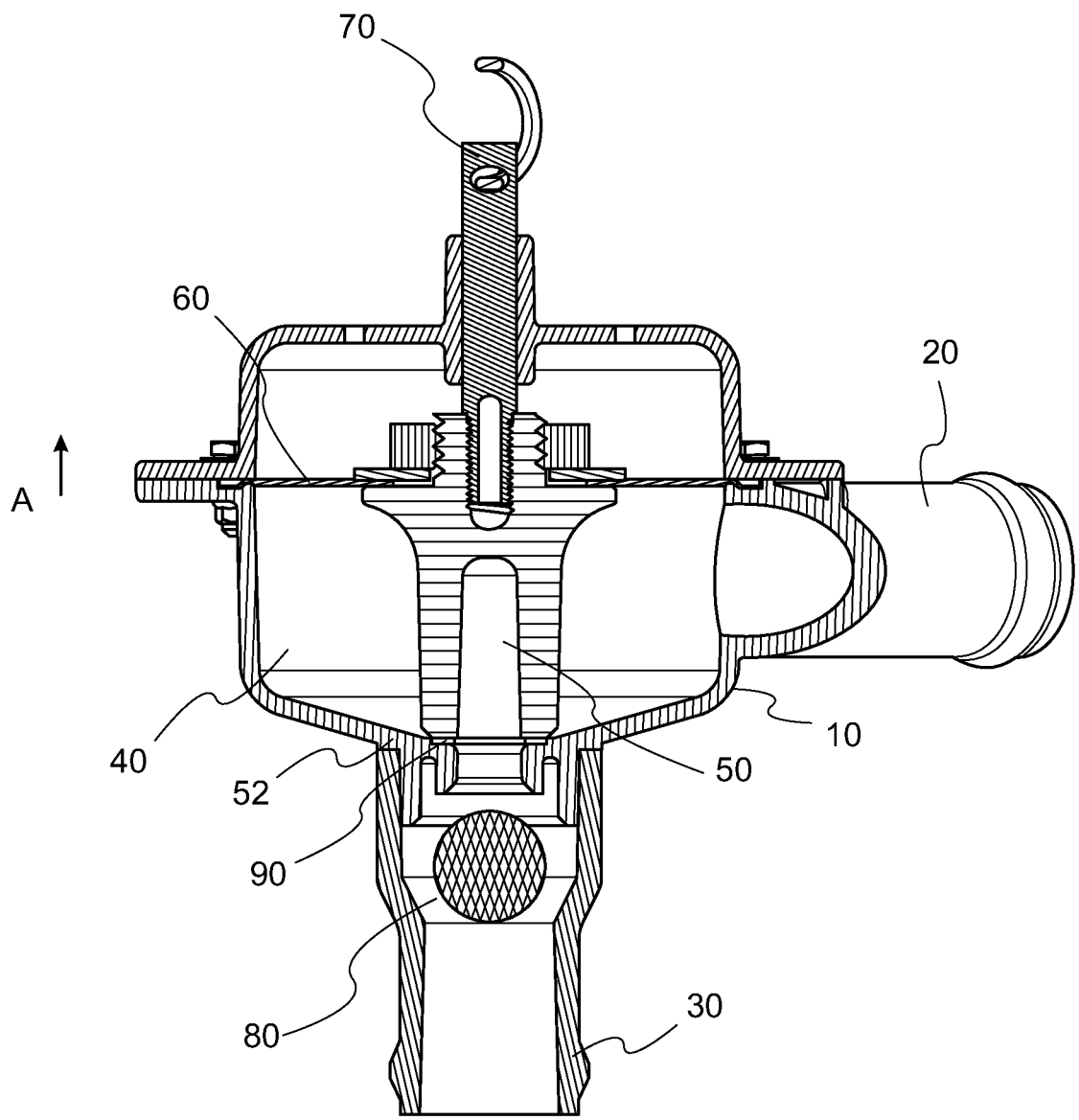
FIG. 1 shows a cross-section of a drain valve assembly as known in the art.

To aid in the explanation of the drain valve assembly according to the disclosure, a conventional drain valve assembly will first be briefly described with reference to FIG. 1. The assembly comprises a housing 10 having an inlet port 20 and an outlet port 30. The inlet port is connected to the source of water to be drained or redirected e.g. the inlet port 20 is fluidly connected to a potable water supply or to a wash basin (not shown). In the example of a wash basin in an aircraft lavatory, the water supplied to the wash basin may be drinking water. If this water is used to wash the hands, it will then flow from the wash basin via the basin waste pipe. This water can be drained from the aircraft or can be used as 'grey water' to flush a toilet etc. In normal operation, water from the inlet port 20 is collected in a reservoir 40. The fluid flow path from the reservoir to the outlet port 30 is blocked by a normally-closed poppet valve 50 that sits in a valve seat 52 formed in the lower part of the housing providing a fluid path to the outlet port. In the closed position, the poppet valve 50 is located in the valve seat 52 thus closing off flow from the reservoir 40 to the outlet port 30. A seal e.g. a gasket seal 90 seals the flow path when the valve is closed. A check valve 80 may be provided in the outlet port 30 to prevent backflow from the outlet port into the reservoir 40. A diaphragm 60 across the top of the reservoir 40 is connected to the poppet 50 and provided to open the valve 50, by lifting the poppet away from the valve seat 52, and thus opening the flow path from the reservoir to the outlet port, when a predetermined pressure is reached due to the water in the reservoir 40. A handle 70 may also be provided to allow a user to manually open and close the valve. In a conventional assembly, the valve is actuated or opened by the force of a head of water in the reservoir, which will usually need to be several inches of water. When the head of water creates sufficient hydrostatic pressure in the reservoir, the diaphragm 70 is pushed upwards (direction A) by that pressure, thus lifting the poppet 50 in the same direction away from the valve seat 52. When the valve is open, a pressure differential between the inlet port 20 (which may be subjected to cabin pressure and hydrostatic pressure) and the outlet port 30 (which may be connected to the waste line or drain mast) causes the water to flow from the inlet port to the outlet port. In many applications, e.g. in aircraft, especially during flight, the pressures on the system at the inlet and the outlet will vary. At flight altitude, where a high negative pressure (vacuum force) is acting at the outlet port, a very high opening force will be required to open the valve. it would be very difficult, if not impossible to overcome the force from the pressure differential, to open the valve, with a relatively small head of water (a few inches) unless a much larger diaphragm were used. A larger diaphragm or a much larger head of water means a greater valve size would be required to open the valve.

The drain valve assembly of this disclosure aims to address this problem by providing a pressure balanced poppet as will be described further below with reference to FIGS. 2 to 3A, 3B, 3C and 3D. The pressure-balanced valve assembly allows the valve to open over different pressure conditions within a confined space.

Figure 2:
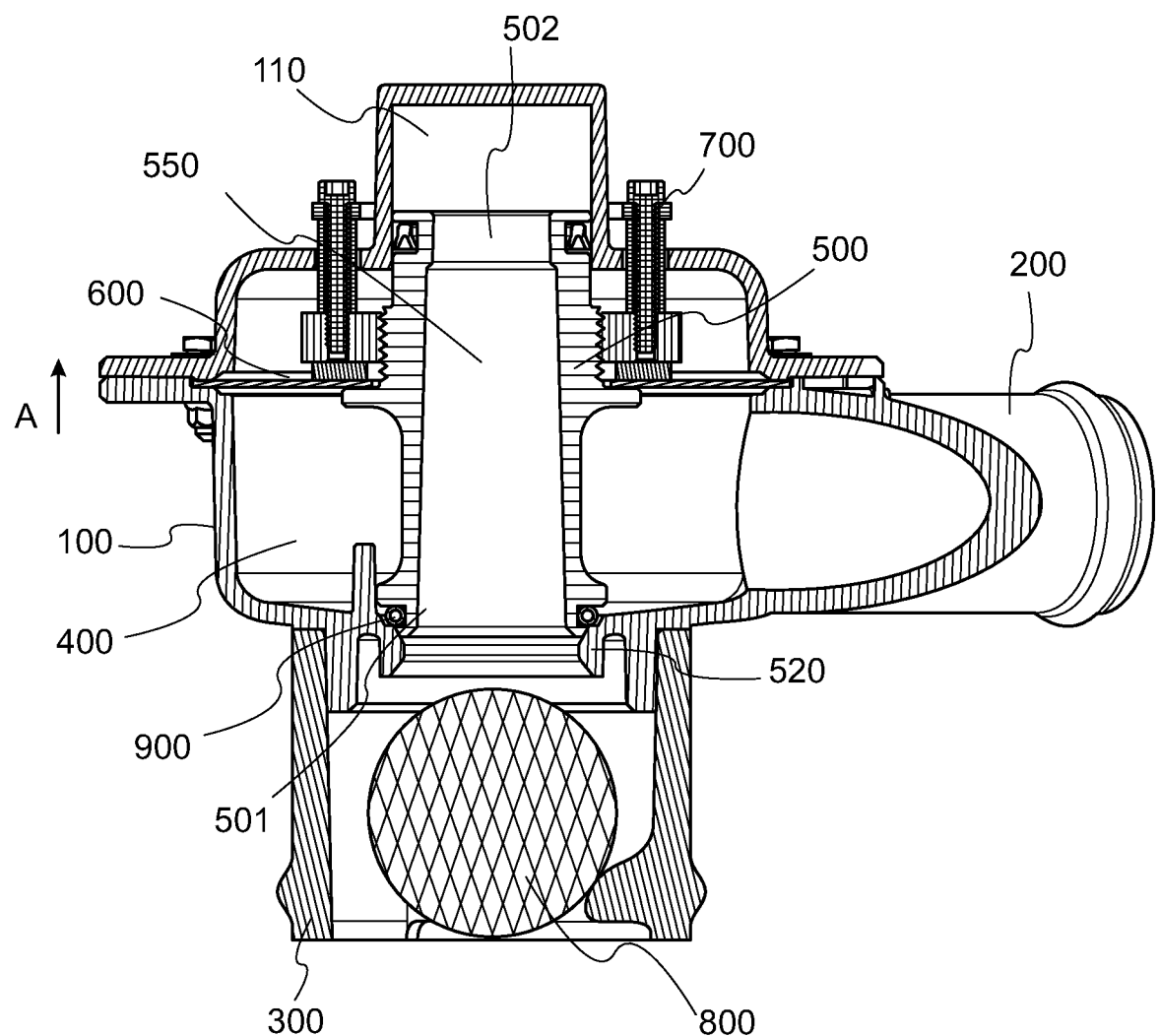
FIG. 2 is a cross-section of a drain valve assembly according to the disclosure.

The valve assembly of the disclosure will be described in more detail with reference to the example shown in FIG. 2.

As with the conventional assembly, the valve is arranged in a housing 100 having an inlet port 200 arranged to be fluidly connected to e.g. a wash basin or toilet (not shown) and an outlet 300 arranged in the bottom of the housing and configured to be fluidly connected to a waste pipe or drain mast (not shown). In the open state, fluid flows from the inlet port 200 to the outlet port 300 through the valve housing due to a pressure differential between the inlet and the outlet, as described above. When the valve is closed (which is its default state) water from the inlet port 200 collects in a collection chamber 400 in the valve housing and is prevented from flowing through the outlet port 300 by means of a poppet valve 500 that is configured to sit in a valve seat 520 across the outlet port 300. A seal 900 is provided between a first end 501 of the poppet and the valve seat to prevent leakage from the chamber 400 when the valve is closed. A check valve 800 may be provided in the outlet port 300 to prevent backflow into the collection chamber 400 when the valve is open. A handle 700 may be provided, attached to the poppet, to allow a user to override automatic operation of the valve and to manually open and/or close the valve.

The poppet 500 of the valve assembly of this disclosure is designed as a pressure-balancing poppet in that it is formed as a hollow poppet body so defining a pressure balancing channel 550 down the middle of the poppet 500 between the first end 501 and a second end 502. The housing 100 is shaped to define a cavity 110 above the open second end 502 of the poppet. The poppet therefore sits in the housing with its first end 501 in the valve seat of the outlet and its second end extending into the cavity formed on the top of the housing. The poppet is held in place by the forces acting on it and is, therefore, a floating poppet. The diameter A of the first end 501 is equal to the diameter B of the second end to provide the required pressure balance.

The operation of the valve assembly will be described further below.

The valve is designed to be a normally-closed valve and so, under normal operating conditions, when a pressure differential is applied, the poppet sits in the valve seat, in sealing engagement therewith. And water coming from the inlet port 200 is collected in the collection chamber 400. To drain the water from the collection chamber to the outlet port, the poppet needs to be lifted (in direction A) away from the valve seat so that the collected water flows from the chamber to the outlet and water from the inlet also flows to the outlet, due to the pressure difference. The valve can be opened manually by a user operating (lifting) the handle 700 that is attached to the poppet. The valve is also arranged to open automatically as described below.

As with the conventional system of FIG. 1, the poppet 500 is attached to a diaphragm 600 across the top of the collection chamber 400. When the pressure in the collection chamber exceeds a predetermined opening pressure, this will push the diaphragm 600 and, therefore, the poppet 500 upwards (direction A) thus lifting the poppet away from the valve seat and opening the outlet port. Due to the hollow design of the poppet, however, when a negative pressure is applied e.g. during flight, the negative pressure at the outlet port, pulling the poppet down into the seat 520, a negative pressure in the cavity 110 is also acting on the poppet in the opposite direction in the cavity 110. Thus, pressure on both sides of the poppet 500 is equalized and the negative pressure has no impact on the opening force of the valve. Whatever the ambient conditions, the opening force to raise the diaphragm will be the same.

In one example, to provide additional force to place the poppet in the closed position, if the weight of the hollow poppet is not enough to retain the normally closed position during normal operation, a spring (not shown) may be provided in the cavity 110 to bias the poppet downwards. The opening force will then need to take into account the spring force.

Figure 3A:
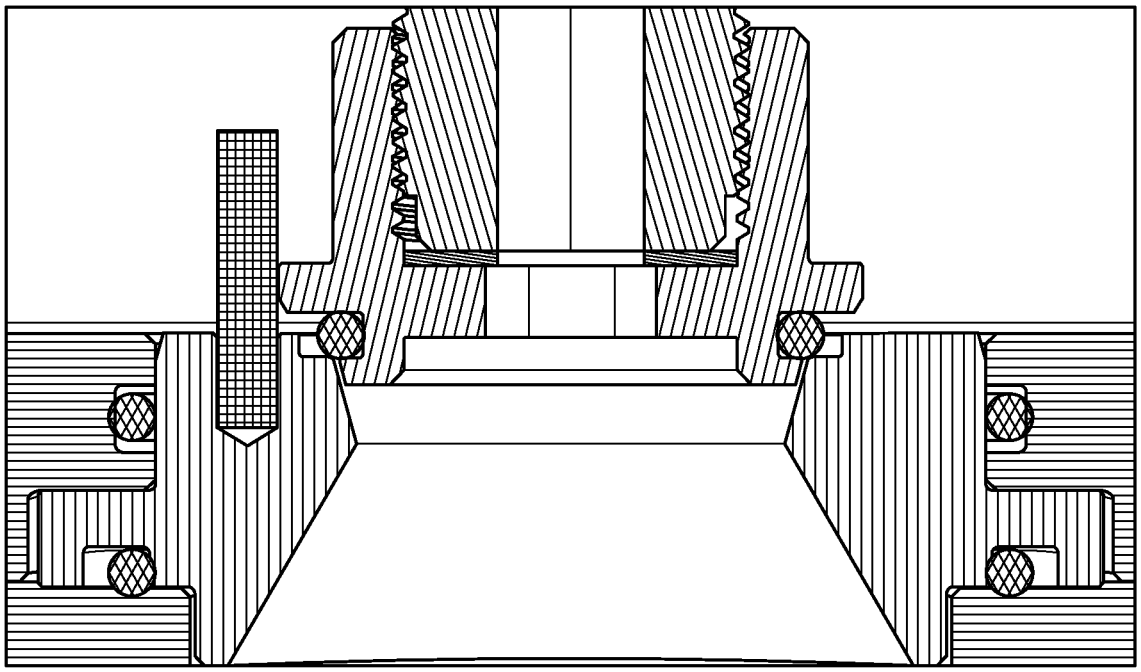
FIGS. 3A, 3B, 3C and 3D show some examples of sealing arrangements that may be used in a drain valve assembly according to the disclosure.
Figure 3B:
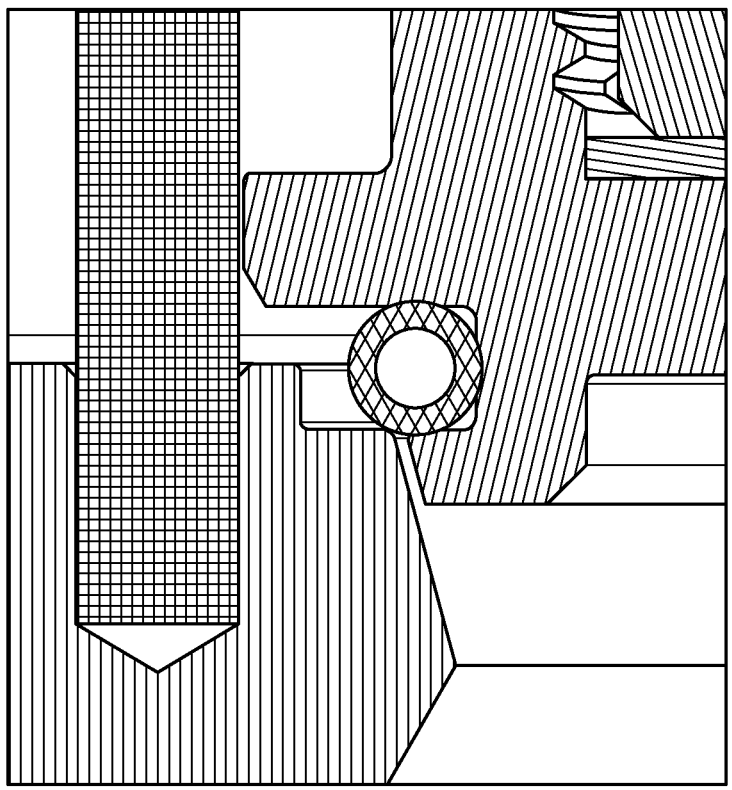
Figure 3C:
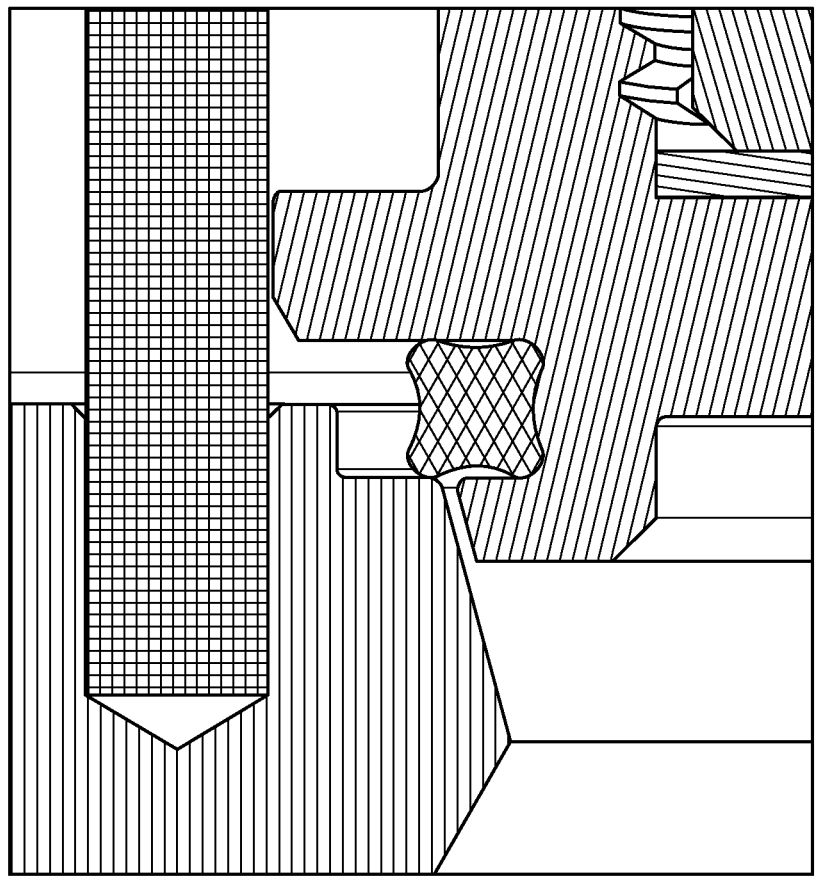
Figure 3D:
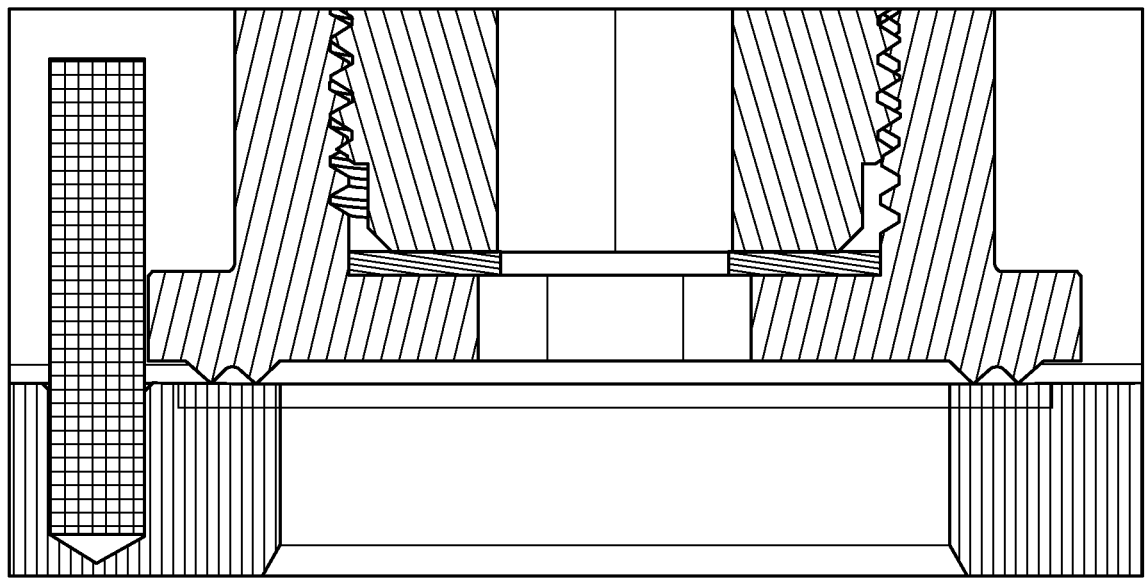

The seal 900 is preferably a seal designed for low pressure applications. Because the assembly does not rely on a large water head, the seals will be prone to low forces. The seal should be such as to provide little resistance to forces acting to open the valve. The seal may be e.g. a solid O-ring (as shown in FIG. 3A), a hollow O-ring as shown in FIG. 3B, an x-ring as shown in FIG. 3C or a flat gasket as shown in FIG. 3D but other types of low pressure seal are also possible.

The valve assembly of this disclosure is able to operate over a wide range of differential pressures without the need for an excessively large head of water and so can be used where space is limited. The design can be easily adjusted to be retrofitted to existing water systems and also finds use in new applications such as for toilet overflow protection where, previously, the large head of water required for opening made such drain valve unfeasible.

While the present disclosure has been described with reference to an example embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A drain valve assembly comprising:
   a valve housing having an inlet port and an outlet port and a water collection chamber between the inlet port and the outlet port; and
   a floating poppet positioned in the water collection chamber and arranged to be normally sealingly positioned across the outlet port to prevent water exiting the water collection chamber to the outlet port,
   wherein the floating poppet is attached to a pressure diaphragm across the water collection chamber such that when the pressure in the water collection chamber exceeds a predetermined opening pressure it causes the diaphragm to lift and to lift the floating poppet out of sealing engagement across the outlet port such that water can drain to the outlet port from the water collection chamber;
   wherein the floating poppet has a hollow body defining a channel from a first end of the floating poppet, adjacent the outlet, to a second end of the floating poppet, and
   wherein the housing defines a vacuum cavity across the channel at the second end, such that a negative pressure acting on one of the first or second ends of the floating poppet in a first direction, in use, is balanced by a negative pressure acting in direction opposite the first direction at an other of the first or second ends of the floating poppet;
   where the cross-sectional diameter of the first end of the floating poppet is equal to the cross-sectional diameter of the second end.

2. A drain valve assembly as claimed in claim 1, comprising a valve seat formed in the outlet port to receive the first end of the floating poppet.

3. A drain valve assembly as claimed in claim 1, further comprising a seal at the first end of the floating poppet to ensure sealing engagement with the outlet port.

4. A drain valve assembly as claimed in claim 3, wherein the seal is a low pressure seal.

5. A drain valve assembly as claimed in claim 4, wherein the seal is one of a solid O-ring, a hollow O-ring, and x-ring or a flat gasket.

6. A drain valve assembly as claimed in claim 1, further comprising a check valve located downstream of the outlet port to prevent backflow into the water collection chamber.

7. A drain valve assembly as claimed in claim 1, wherein the inlet port is configured to be connected to a wash basin or a toilet outlet or a toilet overflow slot and the outlet port is configured to be connected to a drain pipe or drain mast.

8. A drain valve assembly as claimed in claim 1, comprising a spring between the second end of the floating poppet and the cavity to bias the floating poppet to be seated at the outlet port.

9. A drain valve assembly as claimed in claim 1, further comprising a handle attached to the floating poppet to allow a user to manually open and close the floating poppet.

10. A toilet system comprising:
    a toilet; and
    a drain valve assembly as claimed in claim 1 for draining waste water from the toilet.

11. A toilet system as claimed in claim 10, being a toilet system in an aircraft.

12. A toilet system comprising:
    a toilet; and
    a drain valve assembly as claimed in claim 1 for draining overflow water from the toilet.

13. A toilet system as claimed in claim 12, being a toilet system in an aircraft.

* * * * *